United States Patent [19]

Piech et al.

[11] 4,027,980

[45] June 7, 1977

[54] METHOD OF OBTAINING A D(LOG E) CURVE

[75] Inventors: Kenneth R. Piech, Williamsville; John R. Schott, Buffalo, both of N.Y.

[73] Assignee: The United States of America as represented by the Secretary of the Air Force, Washington, D.C.

[22] Filed: Apr. 9, 1976

[21] Appl. No.: 675,676

[52] U.S. Cl. .............................................. 356/203
[51] Int. Cl.[2] .......................................... G01N 21/06
[58] Field of Search ........................... 356/202, 203

[56] References Cited

UNITED STATES PATENTS

| | | | |
|---|---|---|---|
| 2,799,581 | 7/1957 | Bullock | 356/202 |
| 3,096,176 | 7/1963 | Craig | 356/202 |
| 3,883,251 | 5/1975 | Helava | 356/203 |

*Primary Examiner*—John K. Corbin
*Assistant Examiner*—Richard A. Rosenberger
*Attorney, Agent, or Firm*—Joseph E. Rusz; Julian L. Siegel

[57] ABSTRACT

The D(log E) curve of an unknown film is obtained by first measuring a first film having a known D(log E) curve and of the same type as the unknown film. Measured are the densities of a plurality of objects and their corresponding distances for which the object densities decay to film base densities. These values are plotted and with the known D(log E) curve, an x(log E) curve is obtained which is valid for all films of this type. The unknown film is measured to obtain values of object densities and corresponding decay distances and a curve of the values is obtained, and when used with the x(log E) curve for the film type, a new D(log E) curve is obtained for the unknown film.

2 Claims, 6 Drawing Figures

METHOD OF OBTAINING A D(LOG E) CURVE

STATEMENT OF GOVERNMENT INTEREST

The invention described herein may be manufactured and used by or for the Government for governmental purposes without the payment of any royalty thereon.

BACKGROUND OF THE INVENTION

This invention relates to photographic measurements, and more particularly to a method of obtaining a D(log E) curve for an unknown film.

Photographic analyses frequently require knowledge of the density (D) and relative exposure (E) relationship of a film, more commonly called the D(log E) or H and D curve. The D(log E) relationship is usually obtained by exposing the film through a "step wedge" of known log E steps before processing.

Unfortunately, step wedge data is frequently not available for a roll of film under analysis, and a technique to obtain the D(log E) curve directly from the photographic record would be of great value. The present invention discloses such a technique.

The present invention permits determination of the D(log E) relationship of a film record in the absence of a step wedge. The only film information required is specification of film type, so that an $x$ (log E) relationship for that film can be constructed or recalled from previous work. As a result, the technique will greatly expand the data base for remote sensing programs. It will permit use of a large body of imagery, currently in film libraries, which does not have step wedge information and hence is not usable in photometric analyses. It will also permit use of imagery yet to be collected on which step wedge data may be improperly affixed or omitted.

SUMMARY OF THE INVENTION

The subject invention discloses a method of obtaining a D(log E) curve directly for a roll of film under analysis without the need of a step wedge. In particular, the present invention determines the relative exposures of a set of objects appearing at the edge of a film format. These exposures are established by measuring the distance over which density changes from the density of objects (object density) within the photographic scene to the density of the film base (base density). Knowing that the distance required for object density to decay to base density increases with increasing exposure, the distance over which the density change occurs, $x$, is measured for each object. Once the x(log E) curve is known, it is used to determine the exposures of the objects and the D(log E) curve can then be constructed.

It is therefore an object of this invention to provide an efficient method of obtaining a D(log E) curve without sensitometric control wedges.

It is still another object to determine a D(log E) relationship in order to greatly expand the data base for remote sensing programs.

It is still another object to provide a method of determining D(log E) curves to permit the use of imagery in which step wedge data may be improperly affixed or omitted.

These and other objects, features and advantages of the invention will become more apparent from the following description when taken in conjunction with the illustrative embodiments of the accompanying drawings.

DETAILED DESCRIPTION OF THE PREFERRED EMBODIMENT

Figure 1:
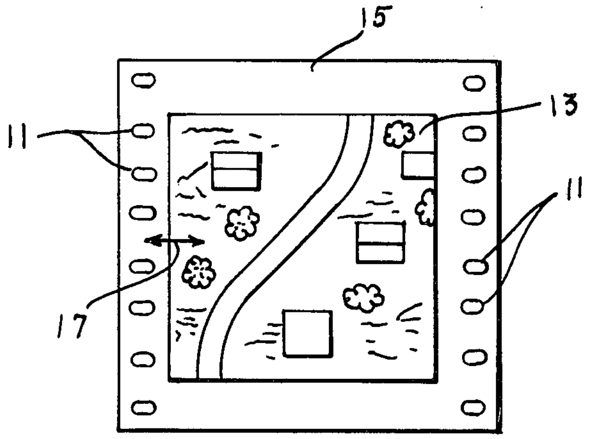
FIG. 1 is a schematic drawing of a typical film format used in the explanation of the invention.

A D(log E) relationship can be determined from a knowledge of the relative exposures of a set of objects within a photographic scene. The objects can be any scene object whose image falls at the format edge of the photograph. The exposures are established by measuring the distance across the edge of the film format, over which the density changes from object density to film base density. The film base density is the density of the unexposed film that lies outside of the frame either between the frame photograph or at the edge of the film. Referring to FIG. 1 which shows a typical film format, sprocket holes 11 line both sides of the enclosed photograph 13 and on the outside of photograph 13 lies the area of film base density 15. The distance 17 over which object density decays to film base density is proportional to object exposure because of scattering within the film emulsion which increases with increasing exposure. This effect is visually very evident in the "blooming" of step wedges placed on certain black and white film types. To first order, the effect is independent of processing variables and is dependent only on film type.

Figure 2A:
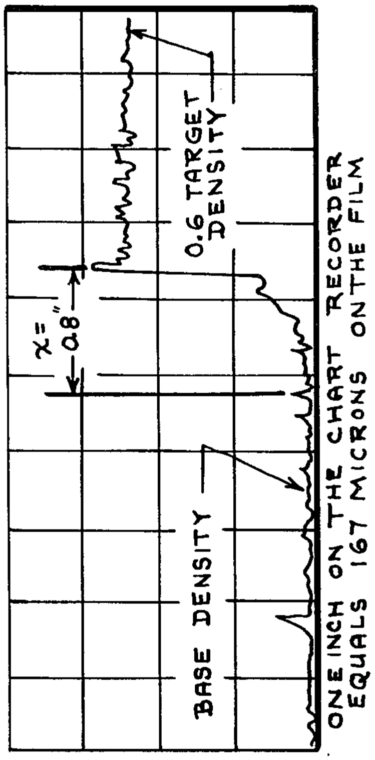
FIGS. 2*a* and 2*b* are plots showing the rate of density changes across an edge of a film for objects of different brightness.
Figure 2B:
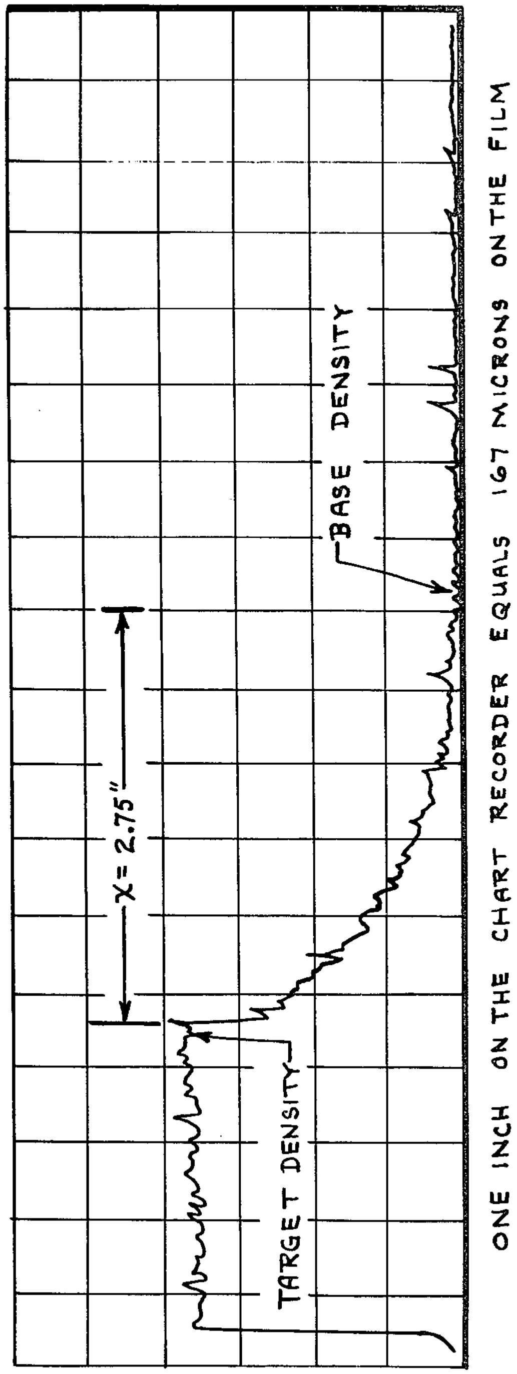
Figure 3:
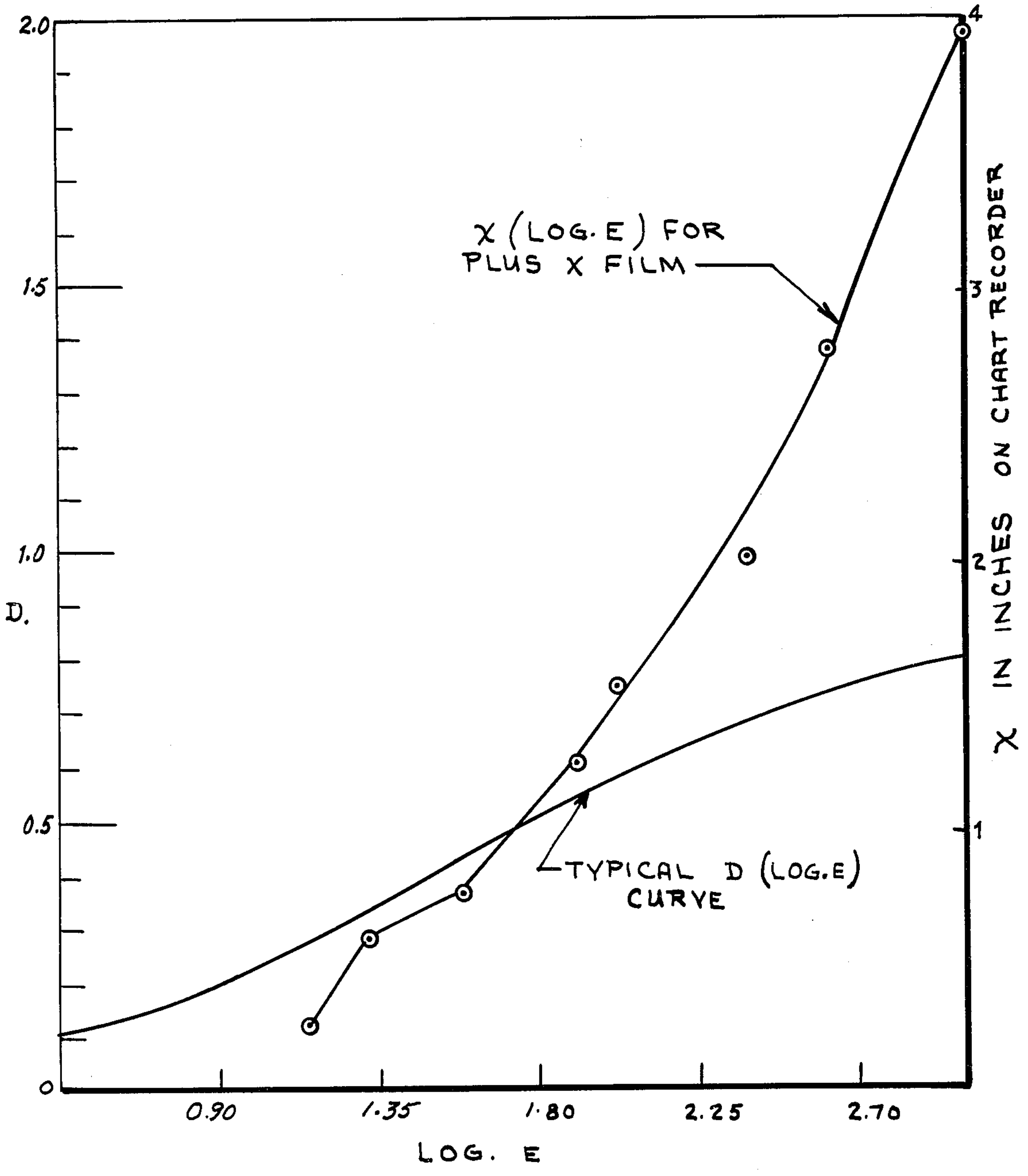
FIG. 3 is a typical D(log E) curve and a resulting $x$(log E) curve for one film type.

FIGS. 2*a* and 2*b* each show a plot of density change to base density on Plus X film for two objects or targets of different exposure. These values can be obtained with a densitometer and a chart recorder. The distance over which the density change occurs, $x$, and the target density reading is indicated for each figure. A plot of the $x$(log E) relationship for Plus X film is depicted in FIG. 3. The measurements of x and D resulted in a curve (not shown) for which the x(log E) curve was determined from the film, in this case Plus X; whose D(log E) relationship is also given in FIG. 3.

The D(log E) relationship for a second Plus X film record was determined by measuring distances of density changes at the format edge of a scene for a set of objects of different exposures. The set of distances and corresponding object densities together with the previously determined $x$(log E) curve of FIG. 3 is then utilized to determine the exposures of the objects using the density values of the second film, so that a new D(log E) could be constructed. The data points from the technique are given by the crosses in FIG. 4. The D(log E) curve for the film as obtained from a step wedge record is given by the solid curve. The $x$(log E) is also displayed for convenience. The agreement between the data points obtained from the method of this invention and the D(log E) from the step wedge data is apparent.

Figure 5:
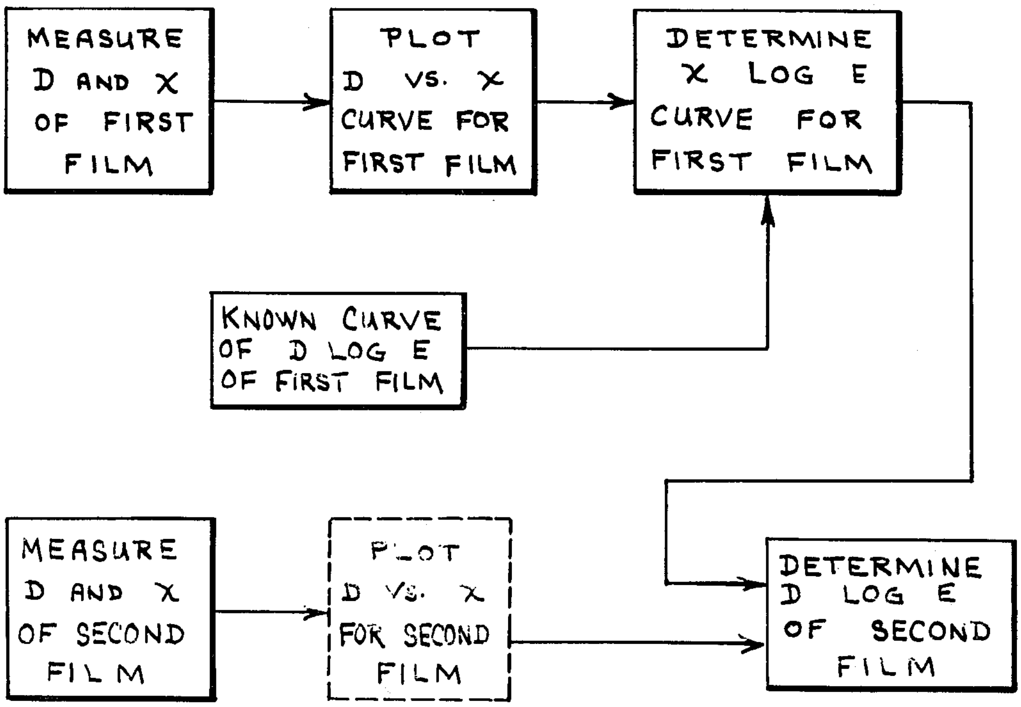
FIG. 5 is a flow diagram showing the method of the present invention.
Figure 4:
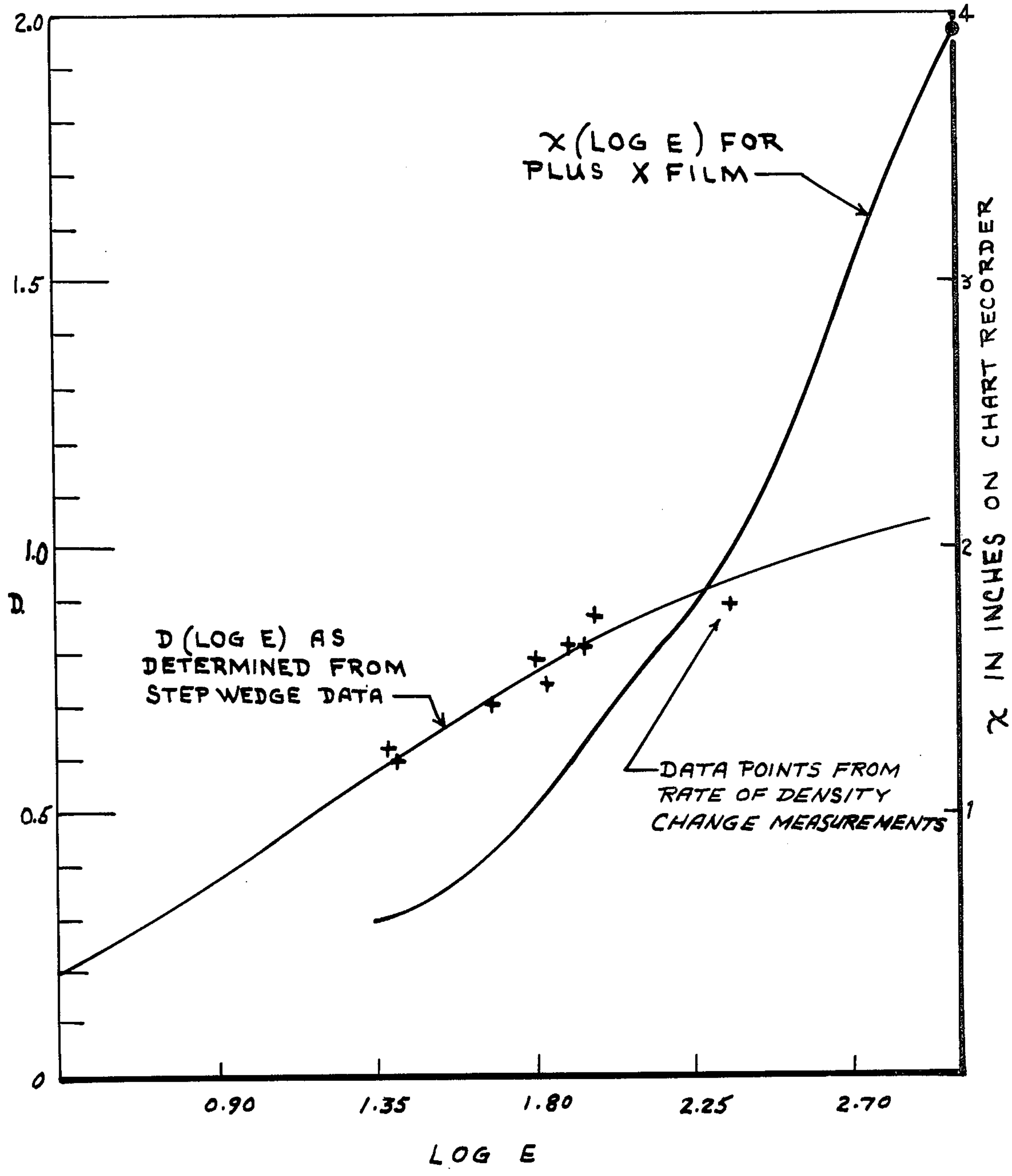
FIG. 4 is a graph showing the determination of a new D(log E) curve from using the method of the invention and a comparison of a D(log E) curve obtained from conventional step wedge data.

A flow diagram is shown in FIG. 5 showing the steps of the invention. Values are obtained from a film having a known D(log E) curve such as a particular film format of Plus X film. The value of densities and distances $x$ can be determined using a densitometer and a chart recorder. These values result in a plot of a curve of D versus $x$ and then using the known D(log E), an $x$(log E) curve can be obtained. This curve is dependent upon film type and not processing unlike the D(log E) curve. A second set of D and $x$ data is obtained from a second film in which the new D(log E) curve is desired. A curve is plotted for these new values of D and $x$ from which using the previously determined $x$(log E) curve the desired new D(log E) curve is obtained. It is also possible to take the unplotted values of x and D and using the $x$(log E) curve plot directly the values d(log E) are as shown in the graph of FIG. 4.

What is claimed is:

1. A method of determining a D(log E) curve for an unknown film comprising:

a. measuring the densities of a plurality of selected objects appearing on a first film having a known D(log E) curve and being of the same film type as the unknown film;
b. measuring a plurality of corresponding distances in which the measured densities decay from object density to film base density;
c. plotting a second curve with the plurality measured densities and the corresponding distances for the first film;
d. determining an $x$(log E) relationship for the first film using the known D(log E) curve and the second curve;
e. measuring the densities of a plurality of selected objects appearing on the unknown film;
f. measuring a plurality of corresponding distances for the unknown film in which the measured object densities decays to film base densities; and
g. determining the D(log E) curve of the unknown film using the measured values of object densities and corresponding measured densities of the unknown film with the $x$(log E) curve of the first film.

2. A method of determining a D(log E) curve from an unknown film according to claim 1 which further comprises plotting a curve for the measured values for the object densities and the corresponding decay distances of the unknown film.

* * * * *